(12) United States Patent
Loechner

(10) Patent No.: US 7,211,990 B2
(45) Date of Patent: May 1, 2007

(54) 4-20 MA INTERFACE CIRCUIT

(75) Inventor: Michael Loechner, Filderstadt (DE)

(73) Assignee: Invensys Systems, Inc., Foxboro, MA (US)

( * ) Notice: Subject to any disclaimer, the term of this patent is extended or adjusted under 35 U.S.C. 154(b) by 378 days.

(21) Appl. No.: 10/496,677

(22) PCT Filed: Nov. 27, 2002

(86) PCT No.: PCT/US02/38125

§ 371 (c)(1),
(2), (4) Date: May 26, 2004

(87) PCT Pub. No.: WO03/048874

PCT Pub. Date: Jun. 12, 2003

(65) Prior Publication Data

US 2005/0007077 A1    Jan. 13, 2005

(51) Int. Cl.
*G05F 1/652* (2006.01)
*H02H 7/10* (2006.01)

(52) U.S. Cl. .................................................. 323/233

(58) Field of Classification Search ................ 323/220, 323/222, 226, 233, 273, 282
See application file for complete search history.

(56) References Cited

U.S. PATENT DOCUMENTS 5,001,358 A    3/1991  Matsuoka et al.
5,159,543 A    10/1992 Yamawaki
6,140,807 A    10/2000 Vannatta et al.
6,600,297 B2 * 7/2003  Takeda et al. ............... 323/266
6,657,405 B2 * 12/2003 Yang .......................... 318/123
6,900,696 B2 * 5/2005  Lautzenhiser et al. ...... 330/295

* cited by examiner

*Primary Examiner*—Matthew V. Nguyen
(74) *Attorney, Agent, or Firm*—Fish & Richardson P.C.

(57) ABSTRACT

A 4–20 mA interface circuit is disclosed having a resistor in series with a DC/DC converter, and further having a current bypass circuit in parallel to the series combination of the resistor and DC/DC converter. In this way, a 4–20 mA analog current at a low frequency may be bypassed around the series combination, whereas a high-frequency current carrying a digital communications signal may be presented with the resistor as its only effective input impedance. In this way, the 4–20 mA current sees an input impedance which allows the 4–20 mA current to be used in supplying power to an external device, whereas the high-frequency current sees an impedance which allows a reliable, low-distortion reading of the digital communications signal therefrom. The high-frequency current may be superimposed on the 4–20 mA, low-frequency current. Portions of the 4–20 mA current not required to power the external device may be shunted to ground, or may be driven back through the DC/DC converter, to thereby present a negative impedance to the 4–20 mA current.

22 Claims, 13 Drawing Sheets

4-20 MA INTERFACE CIRCUIT

TECHNICAL FIELD

This invention relates to industrial control systems.

BACKGROUND

Conventional industrial control systems allow control of remote field devices, such as a valve positioner controlling a fluid flow. For example, such a field device may set a position of the valve ranging from "closed" to "open" (i.e., 0%–100%) based on a current value, ranging, for example, from 4–20 mA provided to the positioner. In such systems, the valve position may vary in direct relation to the current, thus being fully closed at 4 mA and fully opened at 20 mA. The current may be sent from a control system via a two-wire interface, and received at an interface circuit at the field device that converts the analog current signal to a digital signal, which is then analyzed by a processor and applied to adjust the valve position as just described.

The control system is often remote from the field device, and connected only via the two-wire interface. Therefore, conventional industrial control systems often supply power to the field device via the same two-wire interface. The available power may be, for example, a current value of the 4–20 mA control current multiplied by the loop input voltage at the input of the field device.

In addition to the 4–20 mA analog control signal, conventional industrial control systems gain additional control over the field device by adding a digital communications signal to the analog control signal already present on the two-wire interface. The digital communications signal can be used to monitor secondary variables and other data that can be used for tasks including operations, commissioning, maintenance, and diagnostic purposes.

Specifically, for example, a digital communications signal can be added to the 4–20 mA control signal using the Highway Addressable Remote Transducer ("HART") protocol. The HART protocol uses a Frequency-Shift Key ("FSK") modulation technique. Advantageously, the HART protocol is functional in the low-power environment provided by the use of the 4–20 mA control signal for power (resulting in available power in the mW range), and is otherwise compatible with (and therefore easily retrofitted to) existing industrial control systems.

Thus, conventional industrial control systems may provide a 4–20 mA analog control signal, a digital communications signal, and electrical power to a remote field device, all via a two-wire interface. Conflicting requirements of these three signals, along with characteristics of conventional industrial process control settings, may lead to various challenges in implementing robust industrial control systems.

SUMMARY

According to one general aspect, a circuit includes a two-wire interface operable to input a low-frequency, first current and a high-frequency, second current, a first impedance presented to the first current, a second impedance presented to the second current, a DC supply circuit in series with the second impedance to thereby form a series combination, and a current bypass circuit in parallel with the series combination and operable to bypass a portion of the first current around the series combination.

Implementations may include one or more of the following features. For example, the first impedance may be a sense resistance operable to transmit the first current, such that a device variable of a device external to the circuit is set according to a sense voltage across the sense resistance and proportional to the first current.

The first impedance may be in series with the parallel combination of the current bypass circuit and the series combination. The first impedance may be additionally presented to the second current. The second impedance may include a passive resistive element. The DC supply circuit may be a DC/DC converter operable to drive current forwards and backwards therethrough.

The portion of the first current may be determined based on a difference between a magnitude of the first current and an amount of drive current required to drive a load device. The current bypass circuit may be operable to maintain a stable DC voltage at the two-wire interface.

The portion of the first current may be determined based on a magnitude of the first current, thereby forming a pre-determined relationship between an output current of the circuit and the first current. In this implementation, the magnitude of the first current may be measured at the first impedance. An input voltage measured at the two-wire interface may increase with a decrease in the first current. Further, the circuit may present a negative impedance at the two wire interface, and the portion of the current may be driven through the DC supply circuit and output through the two-wire interface.

The first current may have a frequency below approximately 500 Hz. The second current may be super-imposed over the first current and carries a digital communications signal.

According to another general aspect, a circuit may include a resistance operable to determine an impedance seen by a circuit input current when the circuit input current is above a determined frequency, a DC-DC converter in series with the resistance to thereby form a series combination of the resistance and the DC-DC converter, and a bypass circuit in parallel to the series combination, the bypass circuit operable to route a portion of the circuit input current around the series combination when the circuit input current is, below the determined frequency.

Implementations may include one or more of the following features. For example, the resistance may include a passive element, such as a resistor. The DC-DC converter may be further operable to input a first voltage and output a second voltage that is lower than the first voltage.

The bypass circuit may be further operable to draw excess current that exceeds a predetermined level in magnitude and redirect the current away from the circuit output. In this implementation, the bypass circuit may redirect the excess current to ground. Alternatively, the bypass circuit may redirect the excess current into an output of the DC-DC converter, and thereby compensate a voltage drop along a two-wire loop carrying the circuit input current to the circuit. In this case, the excess current may exit the input of the DC-DC converter, traverse the resistance, and be output from the circuit to thereby present a negative impedance to the circuit input current when the circuit input current is below the determined frequency.

The DC-DC converter may be further operable to pass current from an input of the DC-DC converter to an output of the DC-DC converter, and to pass current from the output to the input. The portion of the circuit input current may be shunted to ground, and an input voltage to the circuit may be maintained at a stable value.

The portion of the circuit input current may be used to drive a device that is external to the circuit.

The circuit may also include a sense resistance operable to input the circuit input current, whereby a sense voltage proportional to the circuit input current and taken across the sense resistance may be used to set a device variable for a device external to the circuit. In this case, the sense voltage may further determine an input voltage to the circuit, such that the input voltage decreases with an increase in the circuit input current. Further, a reverse current output by the bypass circuit and not required by the device may be output from the circuit via the DC/DC converter and the resistance, to thereby present a negative impedance to the circuit input current when the circuit input current is below the determined frequency.

According to another general aspect, a circuit may include a first impedance, a second impedance, a DC/DC converter in series with the second impedance and forming a series combination, and a current bypass circuit in parallel to the series combination and operable to present the first impedance to a low-frequency, 4–20 mA first current, and further operable to present the second impedance to a high frequency second current, the second current carrying a digital communications signal and superimposed on the first current.

Implementations may include one or more of the following features. For example, the first impedance may include a sense resistor. The current bypass circuit may present both the first impedance and the second impedance to the second current.

The first impedance may include a negative impedance resulting from a reverse current driven from the current bypass circuit through the DC/DC converter and the second impedance. In this case, a magnitude of the reverse current may be based on a voltage across a sense resistor, the voltage being proportional to the first current.

A portion of the first current may be used to power a device external to the circuit. In this case, a portion of the first current not required to power the device may be shunted to ground by the current bypass circuit, thereby maintaining a circuit input voltage at a stable value.

The details of one or more implementations are set forth in the accompanying drawings and the description below. Other features will be apparent from the description and drawings, and from the claims.

DETAILED DESCRIPTION

Figure 1:
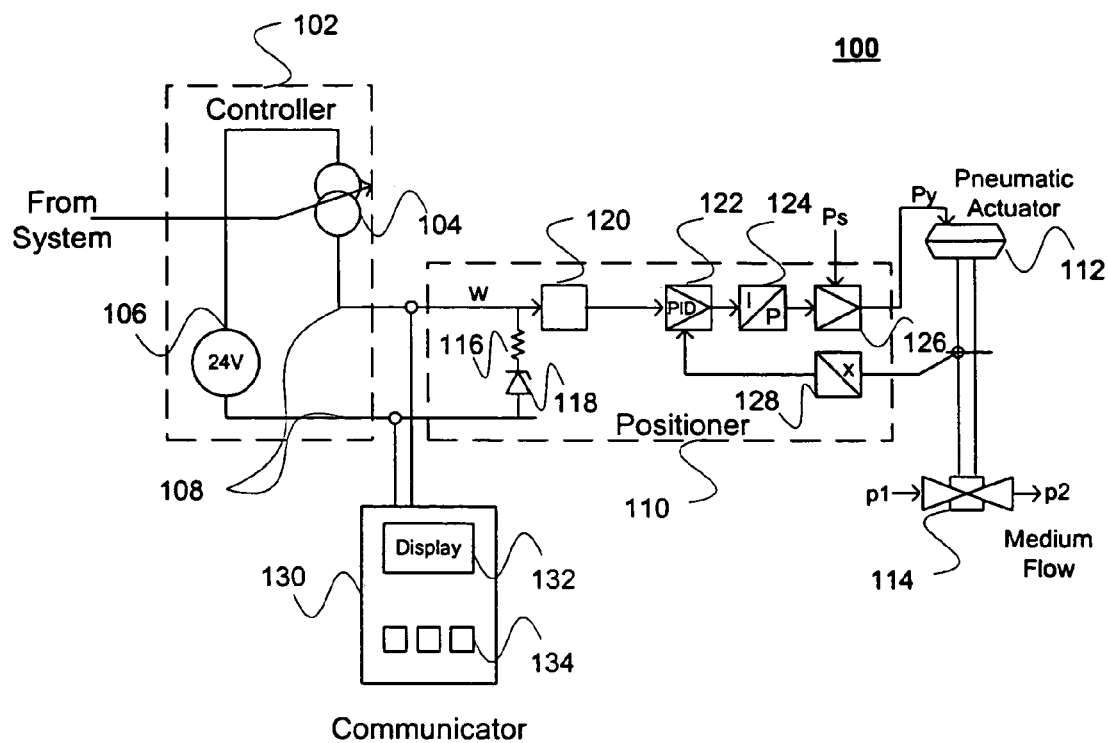
FIG. 1 is a block diagram of an industrial control system.

FIG. 1 is a block diagram of an industrial control system 100. In FIG. 1, a controller 102 modifies a 4–20 mA current output by a current source 104, based on input from an external system and powered by a voltage source 106, which may be, for example, a 24V voltage source.

The controller 102 outputs a certain set value "w," ranging from 4–20 mA, over a two-wire interface 108. The set value w is received at a field device 110 such as, for example, a valve positioner. Of course, the field device could be any one of a number of field devices compatible with the techniques described herein, such as, for example, field devices controlling an external temperature, fluid level, or other process variable.

Valve positioner 110 outputs a pressure $P_y$ to a pneumatic actuator 112, which in turn sets a position of a valve 114 ranging from "fully closed" to "fully open." More specifically, field device 110 receives the set value w via the two-wire interface 108, and is protected from any excessive voltage fluctuations by the combination of, for example, a resistor 116 and a zener diode 118.

An interface circuit 120 receives the set value defined by the set value w from the controller 102, and, as discussed in more detail below, forwards the set value w to a processor 122. Processor 122 digitizes the signal and forwards the digitized signal to a current-to-pressure transducer 124, which outputs a corresponding pressure $P_s$ to a pressure amplifier system 126. The pressure amplifier 126 amplifies the pressure $P_s$ to a larger pressure $P_y$, and outputs $P_y$ to the pneumatic actuator 112.

A position converter 128, such as a potentiometer, senses the actual value of the valve position, and feeds this value to the processor 122 for any necessary adjustments. The processor 122 compares the actual value to the set value w and makes any necessary adjustments using any number of feedback control techniques.

A communicator 130 is connected to the two-wire interface 108, and allows a user to monitor and/or control an operation of the field device 110. The communicator 130 includes a display 132 and an input means, such as, for example, buttons 134.

As explained above, digital communications may be transmitted the two-wire interface 108 simultaneously with the 4–20 mA control signal. Such communications may be transmitted/received by any of the controller 102, the field device 110, and the communicator 130. As described above, the 4–20 mA current is multiplied by a loop input voltage at the meeting of the two-wire interface with the interface circuit 120 of the field device 110 and provides electrical power to the field device, to thereby power, for example, the transducer 124 and the processor 122.

In FIG. 1, various elements which may be used in conjunction with the field device 110 are not shown, for the sake of clarity. For example, a modem such as a HART modem may be utilized to mediate the high-frequency digital communications between the interface circuit 120 and the processor 122. As another example, a display element, such as a light-emitting diode ("LED") array, may be used at the field device 110 to provide a user with information about an operating status of the field device 110.

Issues to be considered in implementing systems such as system 100 are the impedance characteristic(s) of the system and the power characteristic(s) of the system, as well as their overlapping effects on one another. For example, the 4–20 mA current, which is essentially a DC current, should see very low or zero impedance at the interface circuit 120 of field device 110. This is due to the fact that the field device 110 should have enough power available to operate at least the actuator 112 and the processor 122, even at the lowest current setting of 4 mA. On the other hand, there will be times when the current available to the field device 110 will be larger than 4 mA (since the current may range up to 20 mA), which may result in an excessive DC terminal voltage and the possibility of excessive heat and/or short circuits.

In order to meet both of these conditions, field device 110 should generally present a very low impedance to the low-frequency DC current. Even then, additional voltage control may be necessary to provide safe and reliable operation of the system 100, as discussed below.

In contrast to the impedance requirement at low frequencies, high-frequency signals carrying the digital communications from, for example, communicator 130, require a relatively high impedance. Moreover, this communications impedance should be essentially flat over the communication frequency band, so as to avoid distortion of the multiple frequency components contained within the digital communications signal. The communication frequency band may be, for example, 500 Hz–5 kHz or 500 Hz–10 kHz.

Figure 2:
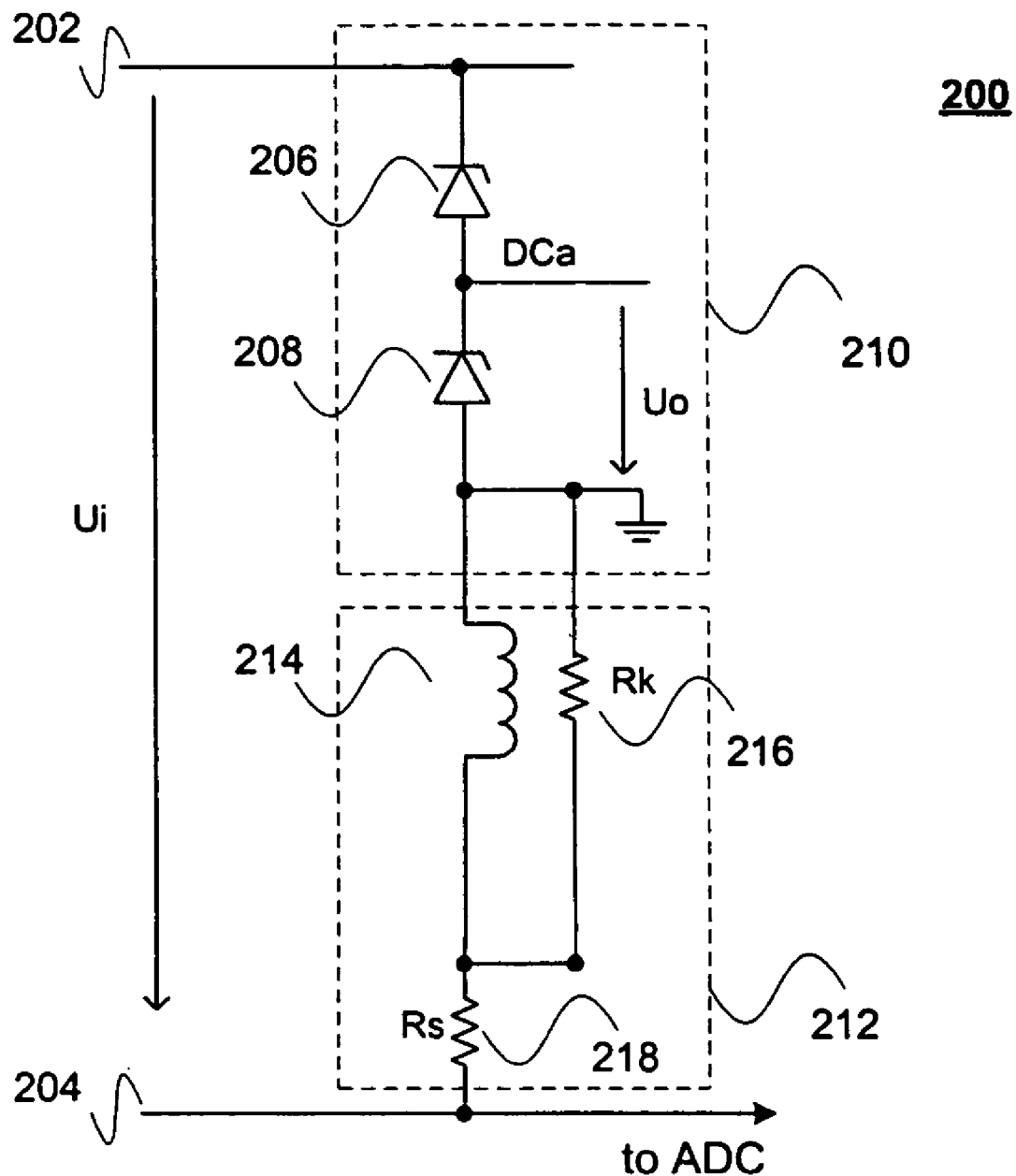
FIG. 2 is a circuit diagram of a first interface circuit.

FIG. 2 is a circuit diagram of an interface circuit 200 corresponding to the interface circuit 120. A specific example of an implementation of circuit 200 is described in more detail in U.S. patent application Ser. No. 09/496,667, which is hereby incorporated by reference in its entirety. FIG. 2 is an abstract or simplified representation of such a circuit that might implement much of the functionality described above with respect to interface circuit 120.

In FIG. 2, interface circuit 200 has an input voltage $U_i$ across positive and negative terminals 202 and 204, respectively. Zener diodes 206 and 208 imply voltage regulation which takes some fraction of the input voltage $U_i$ and outputs this fraction as an output voltage $U_o$, which is used to power circuitry including processor 122 and actuator 112. Excess output voltage is sinked to ground, as shown. The zener diodes 206 and 208 thus represent a power supply (and regulation) circuitry 210.

In series with this power supply circuitry 210 is an impedance control circuit 212, which includes an inductance 214, a resistance $R_k$ 216, and a sense resistor $R_s$ 218. Inductance 214 may imply the electrical characteristic of inductance, rather than a literal inclusion of an inductance coil. Resistance $R_k$ 216 may imply the communications impedance presented to digital communications received at the circuit 200, and may be, for example, on the order of 200 Ohms–1 kOhms. Sense resistor $R_s$ should be relatively low, on the order of, for example, 10–50 Ohms.

The sense resistor $R_s$ 218 is included in series with the parallel combination of inductance 214 and resistance Rk 216, as shown. The sense resistor 218 provides a voltage measurement proportional to the received current, and thereby allows measurement of the current. Accordingly, current is transmitted via the negative terminal to, for example, an analog-to-digital ("ADC") converter (not shown) for conversion of a current value of the 4–20 mA signal to a digital value for use by processor 122. Similarly, high-frequency components of the current may be detected by, for example, a HART modem, which, as mentioned above, may modulate/demodulate such signals for transmitting/receiving digital communications in conjunction with processor 122.

Figure 3A:
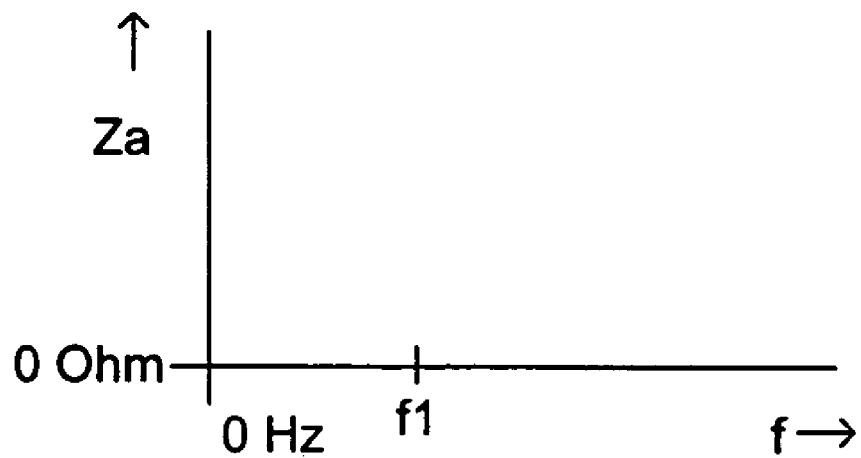
FIGS. 3A and 3B are impedance versus frequency graphs for the circuits of FIGS. 2 and 4.
Figure 3B:
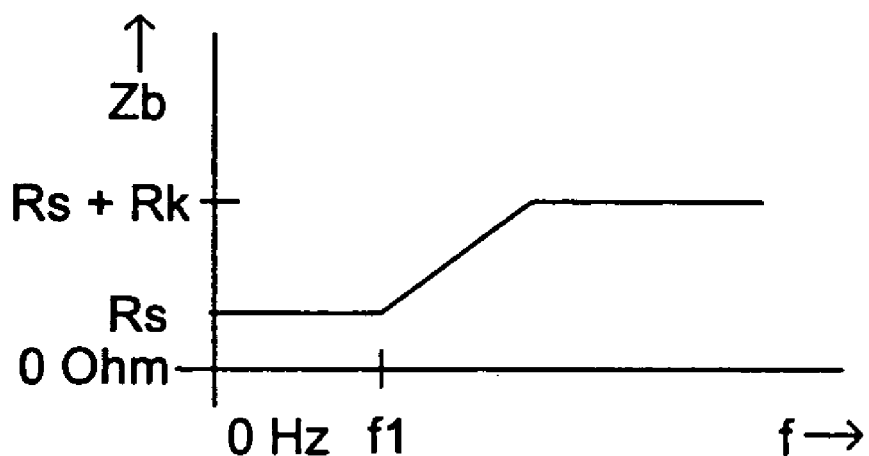
Figure 4:
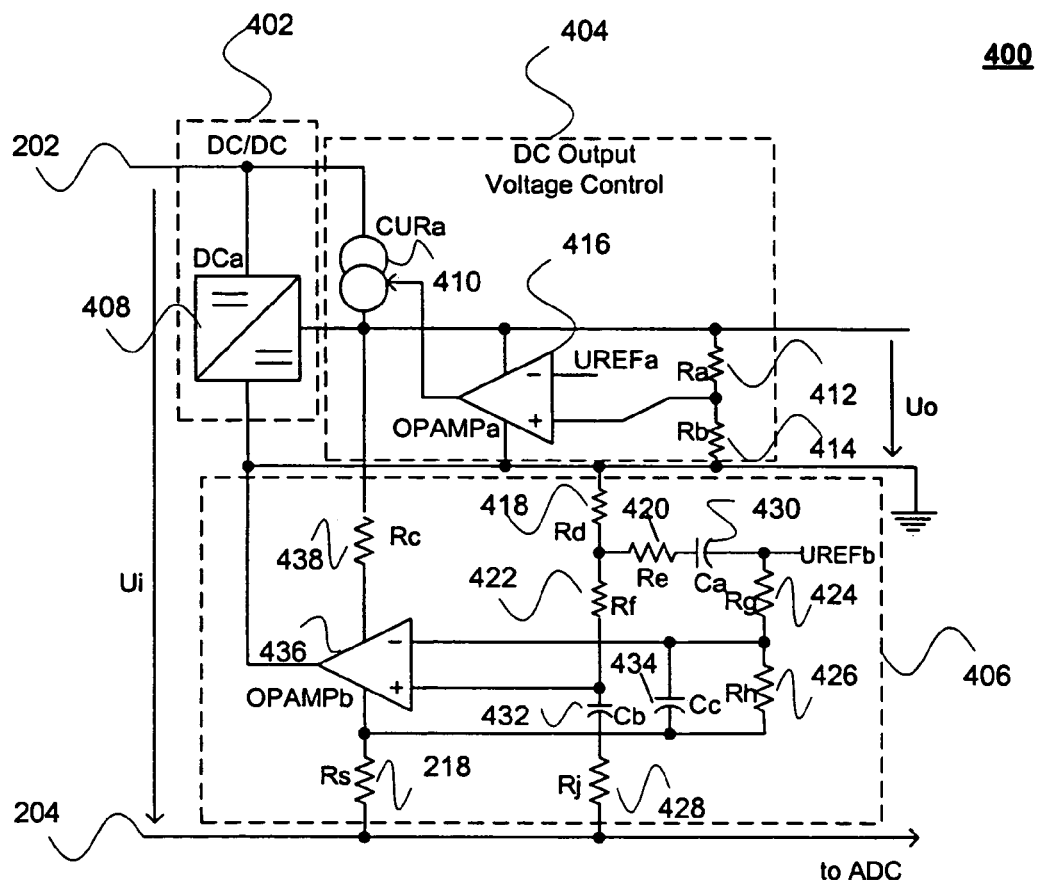
FIG. 4 is a circuit diagram of an implementation of the interface circuit of FIG. 2.

FIGS. 3A and 3B are impedance versus frequency graphs for the circuits of FIGS. 2 and 4. In FIG. 3A, as shown, an impedance of power supply circuitry 210 is essentially zero at all frequency ranges. In FIG. 3B, a DC portion of a current received at terminals 202 and 204 will see a short circuit with respect to inductance 214, and will bypass resistance $R_k$ 216 entirely, seeing only $R_s$ 218 as a resistance. In contrast, an AC signal at a sufficiently high frequency will begin to see a portion of resistance $R_k$ 216 in series with $R_s$ 218, until, at sufficiently high frequencies, $R_k$ combined with $R_s$ the resistance seen by the digital communications signal. $R_k+R_s$ thus provides a flat impedance for a sufficiently wide frequency range (e.g. 500 Hz –5 kHz).

FIG. 4 is a circuit diagram of an implementation 400 of the interface circuit 200 of FIG. 2. In FIG. 4, a circuit 400 includes a power supply circuit 402, a DC output voltage control circuit 404, and an impedance controller circuit 406. The power supply circuit 402 includes a DC/DC converter 408, which inputs a loop input voltage across terminals 202 and 204, and outputs a voltage $U_o$ which is some fraction of the input voltage.

An example of such a DC/DC converter 408 is discussed in commonly-assigned U.S. Pat. No. 6,064,583, which is hereby incorporated by reference. As described therein, such a DC/DC converter has a relationship between an input voltage $U_i$ and an output voltage $U_o$ such that $(n \times U_o)=U_i$; e.g., for a 9V input, an output for n=3 would be 3V. The value "n" may be determined by a user for a particular application, based on available input voltages and DC/DC converters. Additionally, such a DC/DC converter 408 has the characteristic of bi-directional current flow; that is, current may flow from an input to an output of the DC/DC converter, or may flow from the output to the input of the DC/DC converter. Other DC/DC converters having similar characteristics could also be used.

The DC output voltage control circuit 404 includes a current sink 410, which may be, for example, a transistor. The DC output voltage control circuit 404 further includes a resistor 412, a resistor 414, and an operational amplifier 416, as shown. In an operation, the DC output voltage control circuit 404 detects a current higher than the minimum input current 4 mA. If this excess current is required by the load device to increase the supplied power, then the excess current is supplied to the load (e.g., actuator 112) accordingly. Excess current not used at the load may be, for example, sinked to ground, so as to maintain the output voltage $U_o$ at some predetermined (safe) level. Such a current bypass circuit is described in, for example, commonly-assigned U.S. Pat. No. 6,064,582, which is hereby incorporated by reference in its entirety.

The impedance control circuit 406 includes sense resistor 218, which provides for current sensing of the 4–20 mA signal. A plurality of elements including a resistor 418, a resistor 420, a resistor 422, a resistor 424, a resistor 426, a resistor 428, a capacitor 430, a capacitor 432, and a capacitor 434 are all connected so as to provide a filter that is operable to detect the approximately 1 mA peak-to-peak current fluctuations overlying the 4–20 mA current signal which represent digital communications from, for example, communicator 130. When such digital communications are detected, an operational amplifier 436, which is powered by voltages determined at resistor 218 $R_s$ and a resistor 438 $R_c$, operates to determine an impedance seen by the circuit 400.

More specifically, an AC impedance Z of circuit 400 can be expressed in terms of a first impedance $Z_1=R_g+[R_d\|(R_e+1/jwC_a)]$ and a second impedance $Z_2=R_j+1/(jwC_b)$, such that $Z=R_s/[1-[Z_1/(Z_1+Z_2)]*(R_g+R_h)/R_g+R_s/(Z_1+Z_1+Z_2)]$, where $R_g$ is resistor 424, $R_d$ is resistor 418, $R_e$ is resistor 420, $C_a$ is capacitor 430, $R_j$ is resistor 428, $C_b$ is capacitor 432, $R_h$ is resistor 426, and j represents the mathematical constant $\sqrt{-1}$. Thus, a value of Z can be engineered by selecting resistor and capacitor values to determine a value of Z relative to $R_s$.

Figure 5:
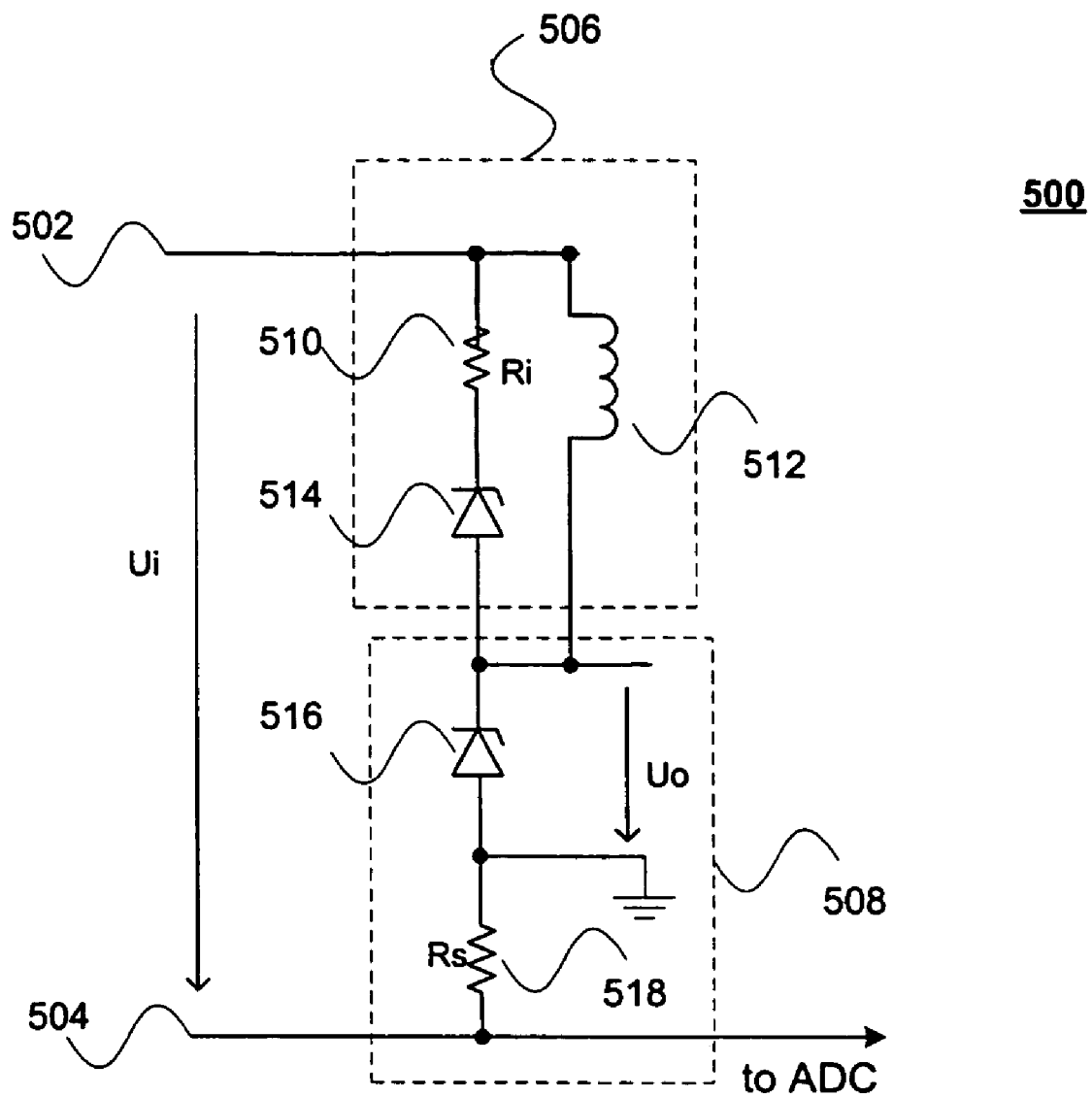
FIG. 5 is a circuit diagram of a second interface circuit.

FIG. 5 is a circuit diagram of an interface circuit 500. In FIG. 5, terminals 502 and 504 define an input voltage $U_i$. An impedance control circuit 506 is connected in series with a power supply circuit 508.

In the impedance control circuit 506, a resistance $R_i$ 510 is connected in series with a voltage control device such as a zener diode 514, both of which are connected in parallel with an inductance 512. The power supply circuit 508 is shown modeled as a second voltage regulation device such as a zener diode 516, which defines an output voltage $U_o$, connected in series with a sense resistor $R_s$ 518.

Figure 6:
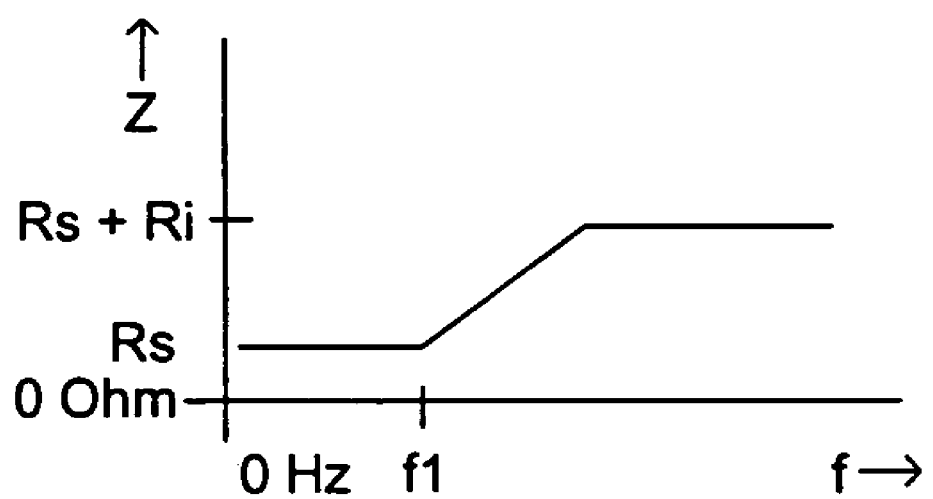
FIG. 6 is an impedance versus frequency graph for the circuits of FIGS. 5 and 7.
Figure 7:
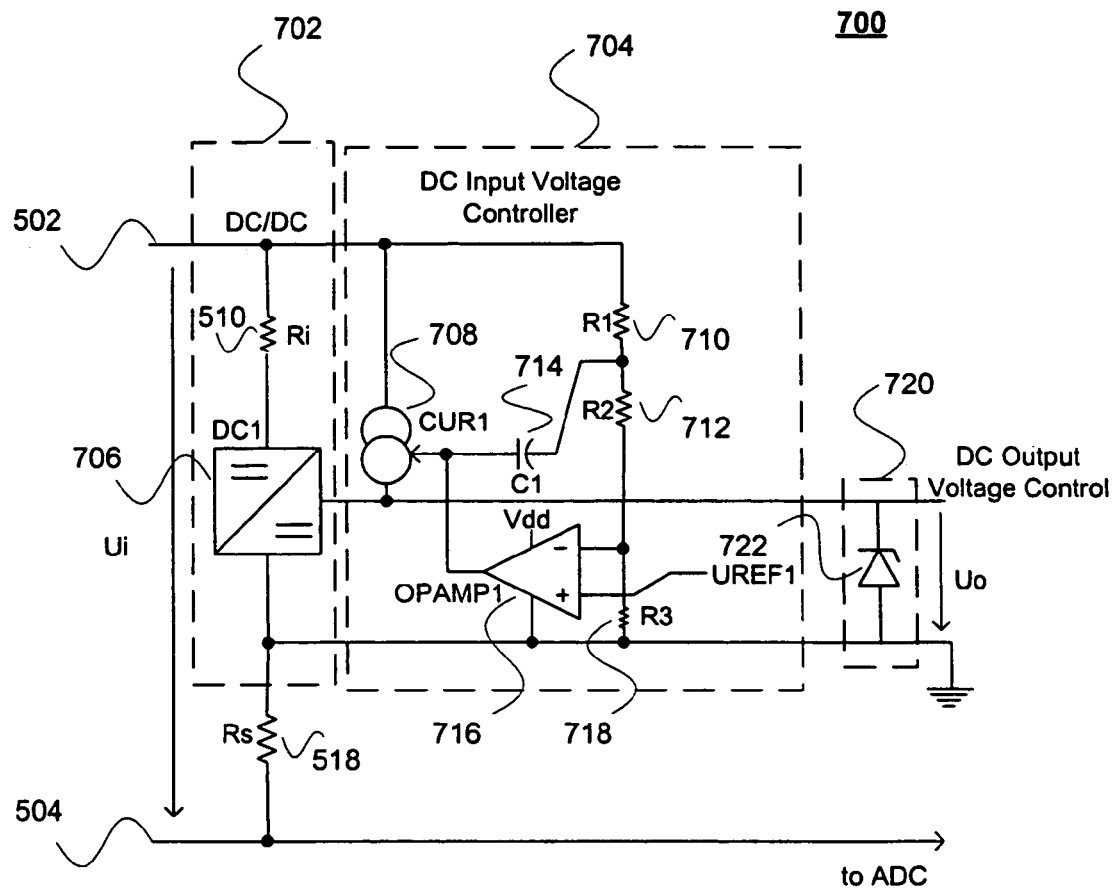
FIG. 7 is a circuit diagram of an implementation of the interface circuit of FIG. 5.

FIG. 6 is an impedance versus frequency graph for the circuits of FIGS. 5 and 7. FIG. 6, shows that an impedance seen by a DC or low frequency signal is the relatively low sense resistance of resistor $R_s$, up to some predetermined edge frequency f1. At frequency f1, the impedance begins to increase until it flattens at a value equal to a resistance of resistor $R_i$ 510 in series with (i.e., added to) sense resistor $R_s$ (shown in FIG. 6 as $R_s+R_i$). This frequency characteristic can be understood from examining circuit 500 of FIG. 5. Specifically, inductance 512 presents a short circuit to low frequency signals, which allows the low frequency signals to bypass resistor $R_i$ 510 and voltage control device 514. At high frequencies, inductance 512 presents an open circuit, thereby forcing high frequency components to traverse resistors $R_i$ 510 and $R_s$ 518.

FIG. 7 is a circuit diagram of an implementation 700 of the interface circuit of FIG. 5. In FIG. 7, a power supply circuit 702 is connected in parallel with a DC input voltage controller circuit 704. The DC power supply circuit 702 includes a DC/DC converter 706, as well as input resistance $R_i$ 510.

The DC input voltage controller 704 includes a current sink 708, as well as a resistor 710, a resistor 712, a capacitor 714, an operational amplifier 716, and a resistor 718. Additionally, a DC output voltage control circuit 720 may include a voltage regulation device such as a zener diode 722, which serves to protect against excessive voltage at the output $U_o$.

In considering the circuit 700 of FIG. 7, it should be understood from the discussion above with respect to FIG. 5 that the parallel combination of the DC input voltage controller 704 with the power supply circuit 702 allows for a bypassing of an input current from an input of the power supply circuit 702 to an output of the circuit 702 for low-frequency signals, while high frequency signals see only the passive resistance of input resistor Ri 510.

Figure 8A:
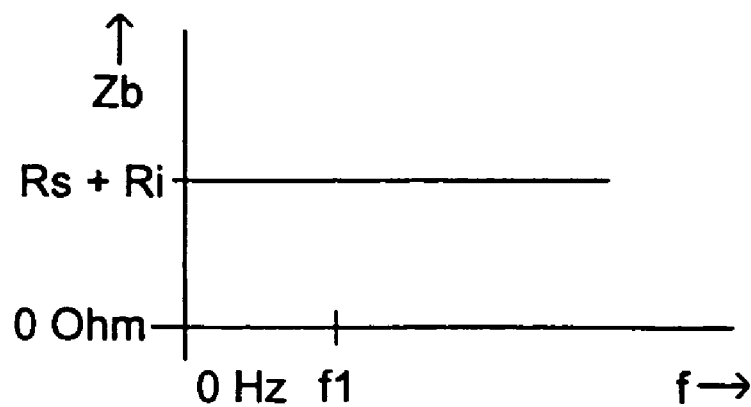
FIGS. 8A and 8B are impedance versus frequency graphs for the circuit of FIG. 7.
Figure 8B:
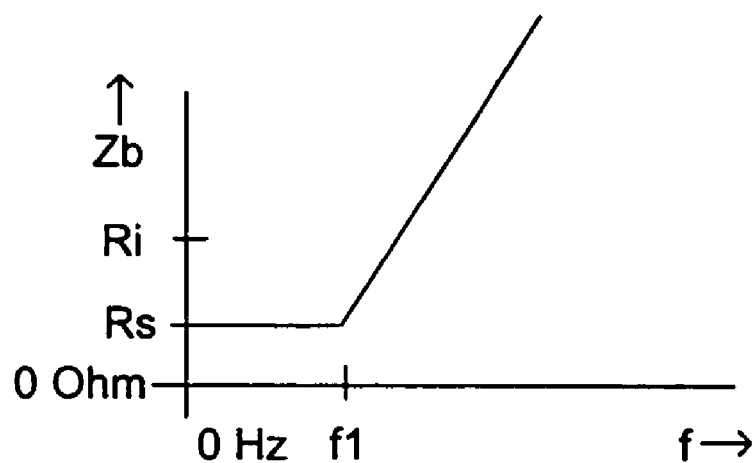

FIGS. 8A and 8B are impedance versus frequency graphs for the circuit of FIG. 7. More specifically, FIG. 8A is an impedance versus frequency graph for the power supply circuit 702, and FIG. 8B is an impedance versus frequency graph for the DC input voltage controller circuit 704. In FIG. 8A, the impedance characteristic of the power supply circuit 702 is simply equivalent to a value of the resistor $R_i$ 510 added to the sense resistance $R_s$. In the implementation of FIG. 7, $R_i$ is a passive element having a constant value. In contrast, in FIG. 8B, input impedance is stable at $R_s$ below a cutoff frequency f1, and grows steadily higher after the cutoff frequency f1. Thus, it should be understood that combining the impedance versus frequency characteristics shown in FIGS. 8A and 8B result in the combined impedance versus frequency characteristic already discussed above with respect to FIG. 6.

The impedance versus frequency characteristics shown in FIGS. 6, 8A and 8B are characteristics which provide low impedance to the 4–20 mA DC current signal, while providing a relatively high and flat impedance to all frequencies above the cutoff frequency f1. Moreover, this impedance versus frequency characteristic can be obtained reliably and inexpensively, since a minimum number of circuit components are utilized, and the communications impedance is provided by the passive resistive element resistor $R_i$ 510.

The presence of the DC input voltage controller 704 allows for the maintenance of a stable DC input voltage. This effect can be better understood by considering an operation of the circuit 700 in the absence of the DC input voltage controller 704. In this case, in considering a value of the resistor $R_i$ 510 to be, for example, 300 Ohms, then an input voltage Ui would be increased by the voltage drop across the resistor $R_i$ 510; i.e., a current magnitude of the current multiplied by, in this case, 300 Ohms. Thus, at 4 mA, there would be an additional 1.2 volts added at the input voltage (i.e., 0.004 A×300 Ohms=1.2V). In the case of a 20 mA input current, however, the increase added by the voltage drop across resistor $R_i$ 510 would grow to be 6 volts (i.e., 0.002 A×300 Ohms=6V). With the presence of the DC input voltage controller 704, however, excess current above 4 mA, not needed by the load device such as actuator 112, is drawn from the input of the DC/DC converter, so that only 1.2 volts may be added to the loop DC input voltage. In this way, the input voltage is stably maintained at, for example, 10.2V (i.e., $V_{in}+V_{Rj}$=9V+1.2V=10.2V).

Figure 9:
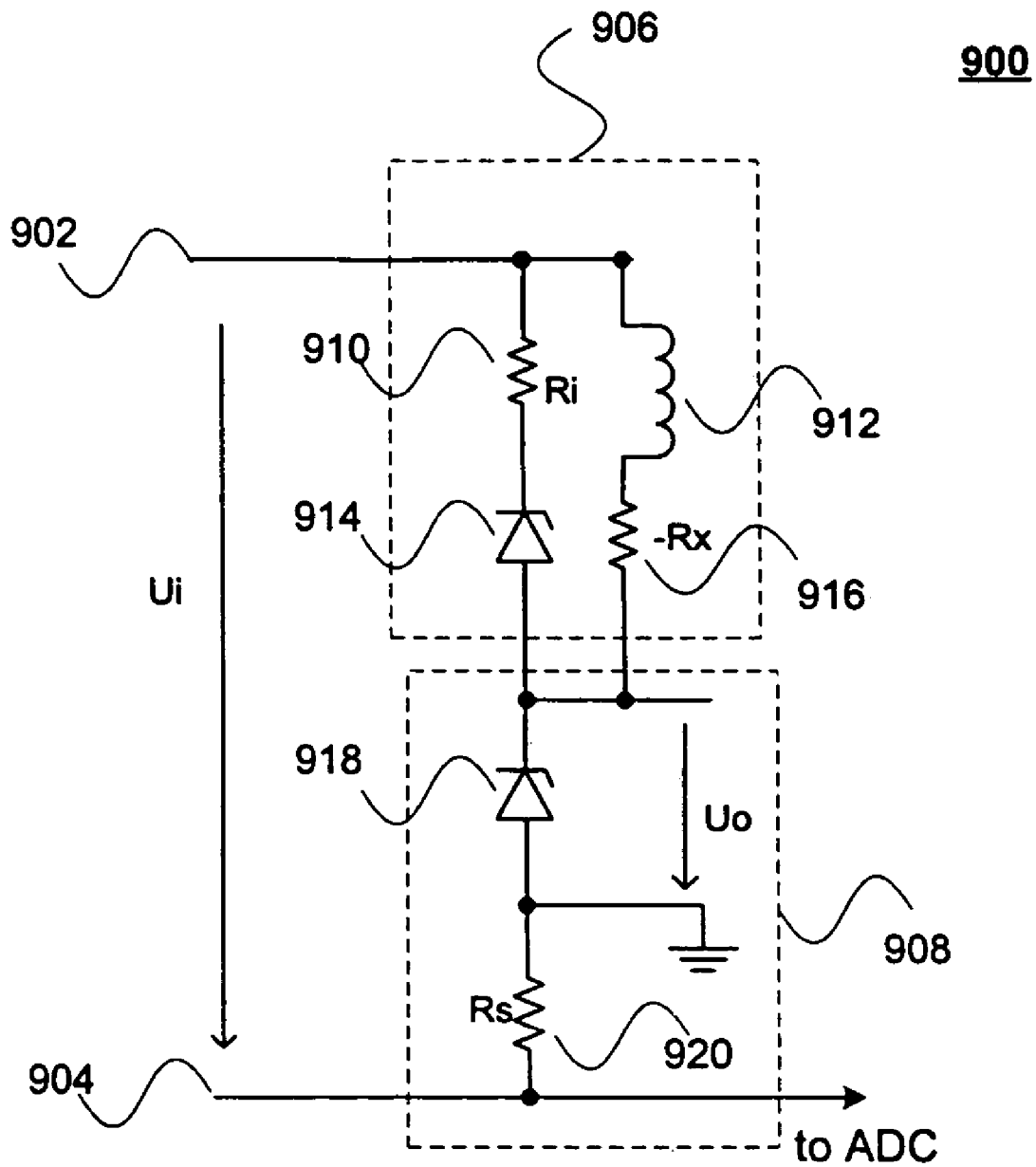
FIG. 9 is a circuit diagram of a third interface circuit.

FIG. 9 is a circuit diagram of an interface circuit 900. FIG. 9 is very similar to FIG. 5, and includes input terminals 902 and 904 defining an input voltage $U_i$, as well as a impedance control and bypass circuit 906 connected in series with a power supply circuit 908. The impedance control and bypass circuit 906 includes a resistor $R_i$ 910, an inductance 912, and a voltage control device 914, much like the corresponding elements in FIG. 5. Additionally, however, the impedance control and bypass circuit 906 also includes a negative impedance $-R_x$ 916. Power supply circuit 908, identically to the power supply circuit 508 of FIG. 5, includes a voltage control device 918, and a sense resistor $R_s$ 920.

Figure 10:
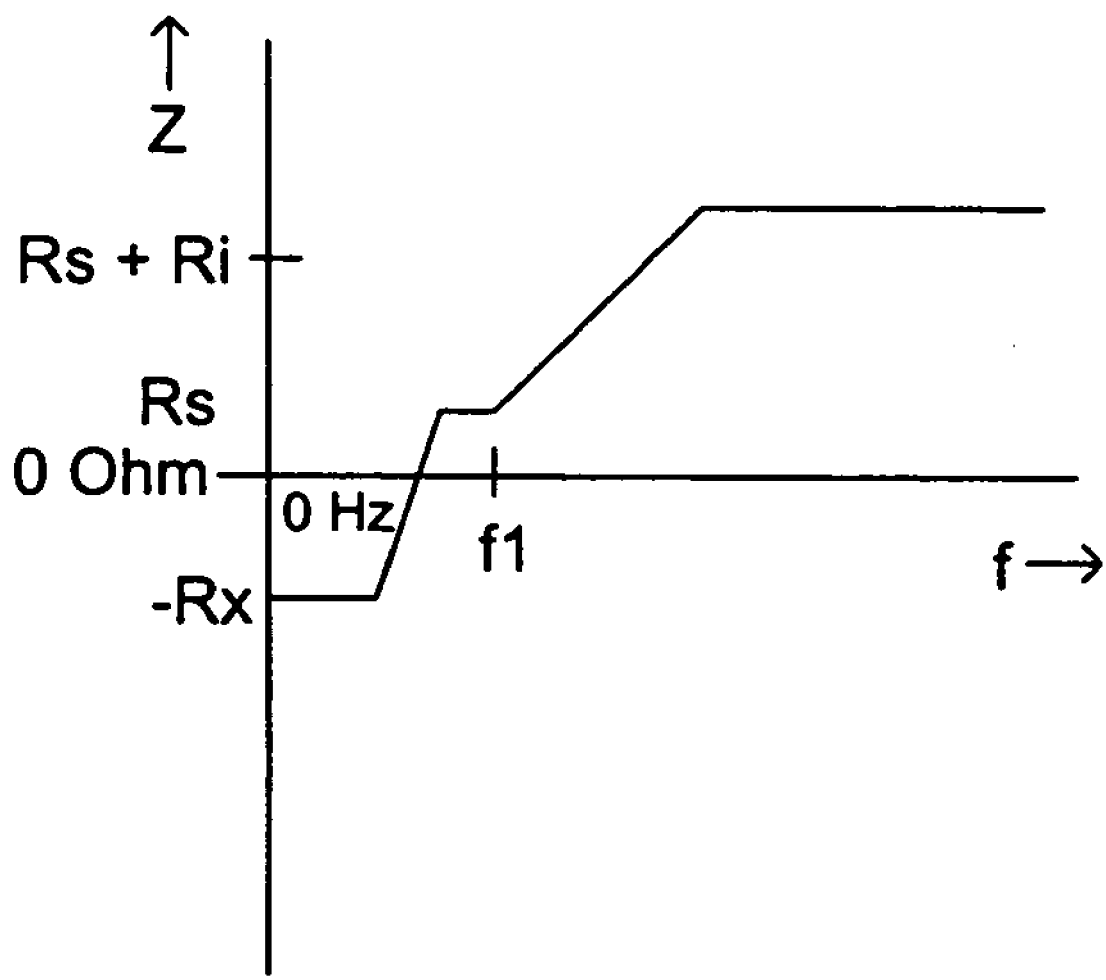
FIG. 10 is an impedance versus frequency graph for the circuits of FIGS. 9 and 12.
Figure 12:
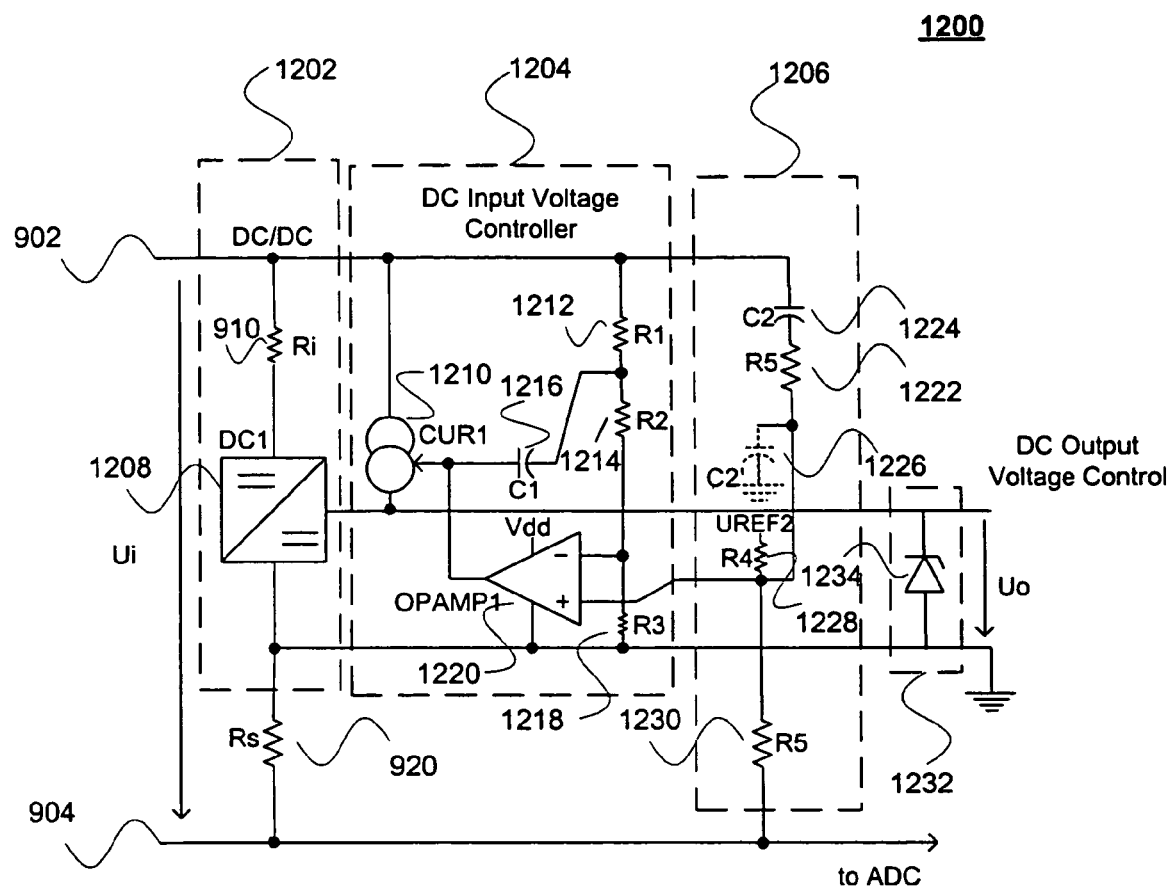
FIG. 12 is a circuit diagram of an implementation of the interface circuit of FIG. 9.

FIG. 10 is an impedance versus frequency graph for the circuits of FIGS. 9 and 12. In FIG. 10, it can be seen that the impedance of circuit 900 of FIG. 9, much like the input impedance of the circuit 500 of FIG. 5, begins to grow rapidly above sense resistance $R_s$ at a predetermined cutoff frequency f1, and flattens at a value equal to a resistance of $R_i$ 910 for frequencies in a digital communication range. Unlike circuit 500 of FIG. 5, however, as shown in FIG. 10, impedance 916 actually imposes a negative impedance on very low frequency signals received at the circuit 900.

Such a negative impedance characteristic provided by impedance 916 may be used to compensate for undesirable voltage drops (and corresponding impedances) which occur, for example, along a length of the two-wire interface 108, or along a security barrier, or other element in series with the circuit 900 and having an impedance. More specifically, as a result of such added, unwanted voltage drops seen by the current source (i.e., current source 104 in FIG. 1), an ac voltage on the current source output may be restricted from sufficiently increasing in a manner consistent with a signal being communicated from the current source 104. In such cases, communication signals on the loop wires may be corrupted. Decreasing the input voltage Ui with increasing current (i.e., negative impedance) essentially compensates this restriction. Moreover, since a low current signal on the two-wire interface 108 creates low voltage drops, while a high current signal creates high voltage drops on any positive loads on the wires, the device input may decrease the input voltage $U_i$ with higher input current, even while sufficient operating power on the device input is stably maintained, as discussed in more detail below.

One way to achieve negative impedance 916 is to create an inverse relationship between the DC input voltage $U_i$ and the input current itself. In other words, as the DC input voltage increases, the input current decreases, which is equivalent to a negative impedance.

Figure 11:
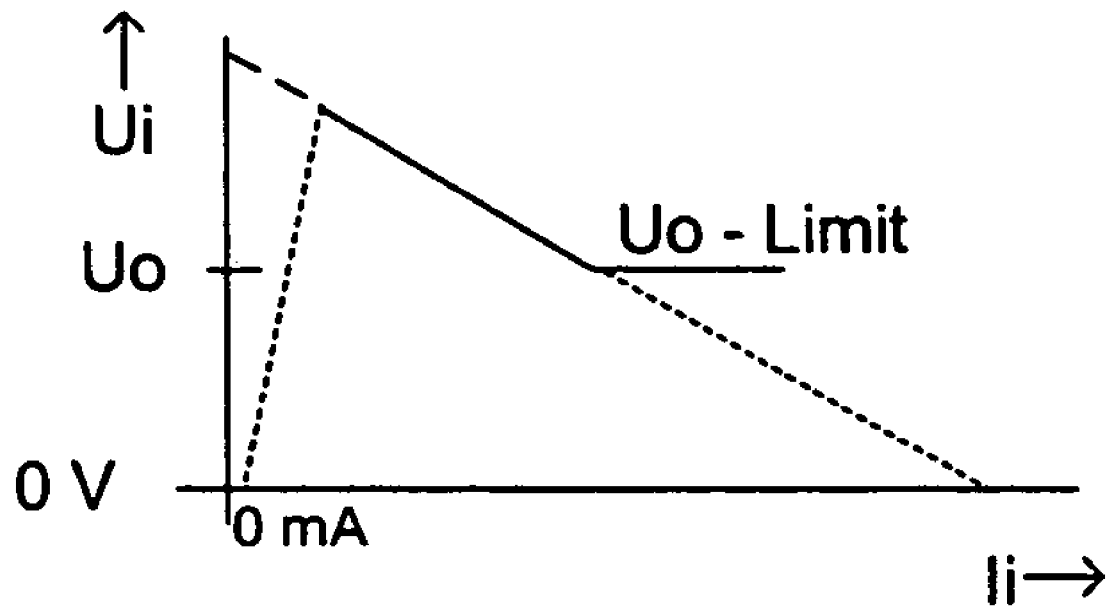
FIG. 11 is a voltage versus current graph for the circuits of FIGS. 9 and 12.

FIG. 11 is a voltage versus current graph for the circuits of FIGS. 9 and 12. In FIG. 11, as just described, increasing current $I_i$ results in decreasing voltage $U_i$, down to a low limit level equivalent to Uo-Limit, i.e., the output voltage $$U_i = U_r \left\{ \frac{[(R_1 + R_2 + R_3)(R_4 + R_5 + R_S)R_5 + R_3 R_5 R_S - (R_1 + R_2)R_4 R_S]}{[R_3(R_4 + R_5 + R_S)(R_4 + R_5)]} \right\} - \qquad (1)$$
$$I_i R_S \left\{ \frac{[R_4(R_1 + R_2 + R_3) - R_3(R_4 + R_5)]}{[R_3(R_4 + R_5 + R_S)]} \right\}$$

minus some predetermined limit level designed to protect against overheating. Thus, in contrast to the circuits of FIGS. 5 and 7, the DC input voltage of FIGS. 9 and 12 is not stable, and, as shown, in fact decreases with increasing current.

FIG. 12 is a circuit diagram of an implementation 1200 of the interface circuit of FIG. 9. In FIG. 12, circuit 1200 includes an impedance control and power supply circuit 1202, the DC input voltage controller 1204, and a frequency compensation circuit 1206. The impedance control and power supply circuit 1202 includes a DC/DC converter 1208, as well as the input resistor $R_i$ 910. As explained above with respect to FIGS. 5 and 7, the resistance $R_i$ 910 is presented to all AC current signals in the digital communication spectrum above the cutoff frequency fl.

The DC input voltage controller 1204 includes a current bypass 1210, a resistor 1212, a resistor 1214, a capacitor 1216, a resistor 1218, and an operational amplifier 1220. As with the DC input voltage controller discussed above with respect to FIG. 7, DC input voltage controller 1204 serves to draw current that exceeds the 4 mA minimum value away from the DC/DC converter 1208.

The frequency compensation circuit 1206 includes a resistor 1222, a capacitor 1224, a capacitance 1226, a resistor 1228, and a resistor 1230. Frequency compensation circuit 1206 is needed due to the fact that resistor 1230 (as opposed to resistor 718, see FIG. 7) measures a voltage difference between a positive terminal input to opamp 1220 and the negative rail 904 (as opposed a difference between the positive terminal input and ground); As a result, and since the opamps 436, 716, and 1220 all attempt to obtain a zero voltage differential at their input terminals, opamp 1220 must respond to an increased negative value at rail 904 (due to, for example, increased current) by increasing a voltage value at the rail 902. In this way, a fixed relation can be obtained between an input current (i.e., voltage at negative rail 904) and voltage at rail 902. However, because the input current/voltage at rail 904 is related to an AC value of the input current, the opamp 1220 might transfer this AC value to the rail 902, as well. The frequency compensation circuit 1206, by selecting appropriate values for resistor 1222 and capacitor 1224 relative to resistor 1230 and resistor 1228, filters these AC components from the rail 902. Thus, the frequency compensation circuit 1206 allows an increase in impedance of DC input voltage controller 1204 at higher frequencies, which is the desired behavior for circuit 1200, as explained above.

As shown in FIG. 12, the reference voltage for the operational amplifier 1220 has a dependence on the sense resistor 920, such that the reference voltage changes with the input current. Moreover, the input of the operational amplifier 1220 compared against the reference voltage is also dependent on the input current, as shown by the connection of resistor 1230 to terminal 904 (as opposed to a connection of resistor 718 to ground in FIG. 7). The extent to which the reference voltage changes with the input current depends upon the resistors 1212, 1214, 1218, 1228, and 1224.

More specifically, the input voltage can be defined by the equation (1):

In equation (1), it can be seen that an increase of current $I_i$ will result in a decrease in $U_i$ when the term R4*(R1+R2+R3) is higher than the term R3*(R4+R5), in the numerator of the second term in the difference. This relationship can also be expressed as R4*(R1+R2)>R3*R5, due to the presence of the term R3*R4 in both terms.

Thus, in equation (1) and referring back to FIG. 11, $U_i$ will be theoretically maximized when $I_i$ is zero; however, in this case power to a load device will also be zero (since Power=$I_i$*$U_i$=0). When the current $I_i$ reaches a point where a necessary level of power is reached (typically, a point slightly below 4 mA), then equation (1) governs and the relationship between $U_i$ and $I_i$ in FIG. 11 is demonstrated. When the current $I_i$ exceeds the limit of 20 mA, any excess current causes $U_i$, theoretically, to reduce to zero and thereby protect the circuit 1200 and associated wiring from overheating. While theoretically the input voltage goes to zero as just described, this behavior may not actually exist. For example, a technique for decreasing the input voltage $U_i$ such as sinking the current from the input to the output (e.g. with a transistor) will only work until a level of the output voltage is reached, whereupon a further increase of input current will increase the power to the circuit 1200.

In such a case, it may occur that $U_i$ will increase with current beyond 20 mA, thereby presenting the possibility of overheating. To avoid this circumstance, an impedance circuit may be added at the connection defined by terminals 902 and 904 that effectively shuts off the input current $I_i$ at some value above 20 mA, such as, for example, 23 mA. Such a circuit may be designed to present little or no impedance beneath the cut-off value of, for example, 23 mA, but to present extremely high impedance above this cut-off value. In this case, power to the field device 110 and related circuitry is effectively and safely limited.

Thus, in contrast to the circuits 400 and 700, circuit 1200 does not rely on the device load to determine a magnitude of the current to be bypassed; rather, an amount of output current to be bypassed is predetermined with respect to a particular input current. As long as the output current for all input currents is sufficient to drive the load device(s), the circuit 1200 will be operational. In cases where the output current exceeds the level necessary to drive the load device (s), a DC output voltage control circuit 1232 having a voltage regulation device such as a zener diode 1234 may be used to sink the excess current.

Moreover, in contrast to the circuit 700, the DC input voltage is not held stable at a predetermined value for various input currents. Rather, the DC input voltage decreases with an increasing input current, thereby providing the negative impedance characteristic discussed above.

In FIGS. 4, 7, and 12, it is assumed that the various DC/DC converters are of the type which are capable of driving current forward and backward through the converter, which are discussed above with respect to U.S. Pat. No. 6,064,583. Accordingly, the DC input voltage controller circuit 1204 can not only bypass excess current from an input of the DC/DC converter 1208, it also may redirect current back through the DC/DC converter 1208 and over the resistor $R_i$ 910 and the two-wire interface 108 (defined in FIG. 12 by terminals 902 and 904). This current, opposing the flow of current of the 4–20 mA signal as described above, has the affect of providing the negative impedance to the incoming current signal, thereby compensating for any undesired voltage drops which occur at any impedances which may be in series with the interface circuit 1200.

Figure 13A:
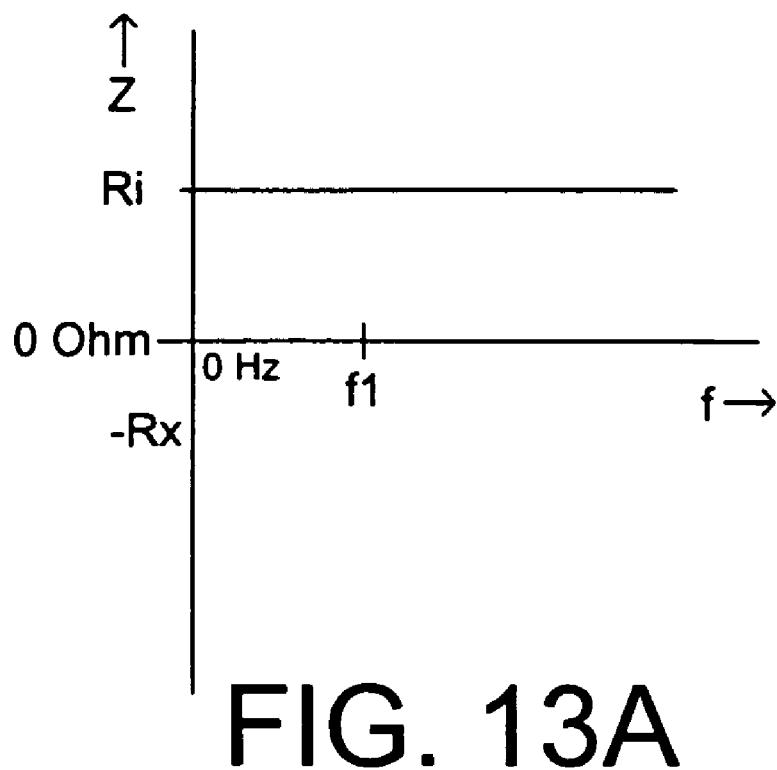
FIGS. 13A and 13B are impedance versus frequency graphs for the circuit of FIG. 12.
Figure 13B:
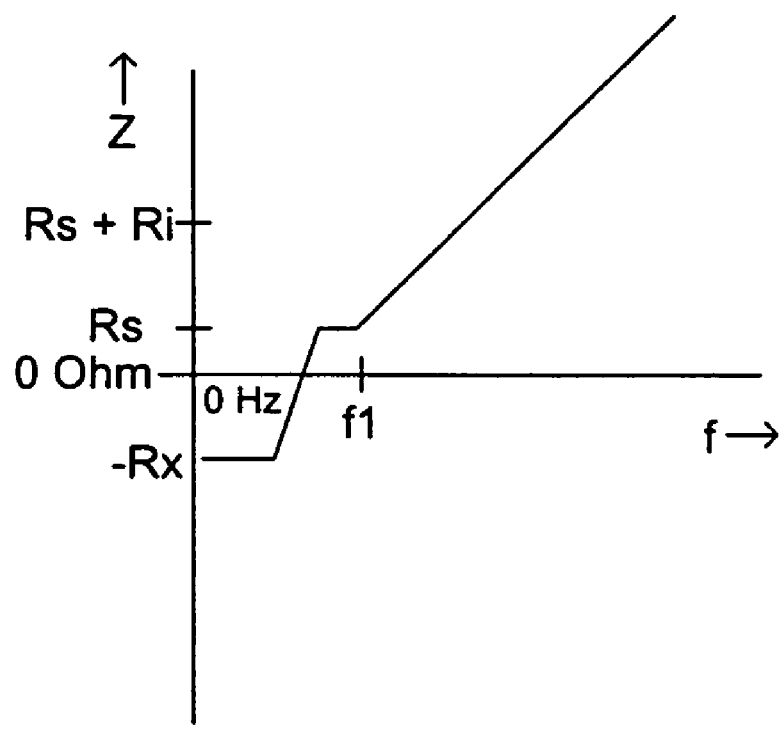

FIGS. 13A and 13B are impedance versus frequency graphs for the circuit of FIG. 12. FIG. 13A shows that, for all frequencies, an impedance that exceeds the impedance controller and power supply circuit 1202 is equivalent to the value of the resistance $R_i$ 910 added to the resistance of the sense resistor 920 $R_s$ 920. In FIG. 13B, the negative impedance 916 $-R_x$ is in existance at very low frequency ranges, and grows to $R_s$. At the cutoff frequency f1, the impedance grows indefinitely for the DC input voltage controller circuit 1204. Thus, a combination of the graphs of FIGS. 13A and 13B yields the impedance versus frequency graph shown in FIG. 10.

As an additional advantage, the reverse current that is present in the operation of circuit 1200 can be additionally used to provide digital communication and redirection of communicator 130 (FIG. 1). In general, transmissions from a circuit such as circuit 400, 700, or 1200 may be performed by voltage modulation. However, in circuit 1200, the reverse current may be modulated as it is output from the DC/DC converter 1208 and routed through resistance $R_i$ 910, thereby allowing digital communications via this modulated current signal. Of course, this technique for digital communications is only available in situations where the input current exceeds 4 mA and the excess is not needed in its entirety to drive the load device (i.e., when the input voltage controller circuit 1204 is bypassing current).

In conclusion, implementations have been disclosed which inexpensively and reliably provide a 4–20 mA interface circuit having a dual impedance characteristic such that a first impedance is presented to a first current signal, and a second impedance is presented to a second current signal. For example, the first impedance may be a low passive resistance, and the first current signal may be a DC 4–20 mA current signal. The second impedance may be a higher passive resistance, and the second current signal may be an approximately 1 mA peak-to-peak AC signal imposed on the 4–20 mA current signal for carrying digital communications. As described, the first impedance may be a sense resistor, and a voltage across the sense resistor serves to measure a current magnitude of the 4–20 mA signal. The second impedance may be one or more resistors in series with a power supply circuit such as a DC/DC converter, where a resistance of these resistors is added to a resistance of the sense resistor.

In order to present the dual impedances to the two current signals as just described, the second impedance may be placed in series with the power supply circuit, and this series combination may be placed in parallel to a current bypass circuit having an inductive electrical characteristic. This combination of the second impedance, power supply circuit, and current bypass circuit may then be placed in series with the first impedance. In this implementation, low-frequency signals such as the 4–20 mA current signal are short-circuited around the second impedance and power supply circuit, seeing only the first impedance (e.g., sense resister). In contrast, high-frequency signals see the effectively open-circuit inductive current bypass circuit, and see the first and second impedances in series with one another.

When the 4–20 mA signal exceeds a pre-determined current value minimum of, for example, 4 mA, and the excess is not required by a load device associated with the interface circuit, the current bypass circuit may sink the excess current to ground. Alternatively, routing of such excess current may be made dependent upon the voltage across the first impedance (e.g., the sense resistor), so that an output current is fixed to a pre-determined amount corresponding to the value of the input current. In this case, the excess current may be driven through the power supply circuit and back onto a two-wire interface associated with the interface circuit, to provide the interface circuit with a negative impedance characteristic. This negative impedance characteristic may be used to compensate for unwanted voltage drops associated with the two-wire interface. Additionally, the current driven back through the power supply circuit may be used to transmit digital communications from the interface circuit over the two-wire interface.

A number of implementations have been described. Nevertheless, it will be understood that various modifications may be made. Accordingly, other implementations are within the scope of the following claims.

What is claimed is:

1. A circuit comprising:
    a two-wire interface operable to input a low-frequency, first current and a high-frequency, second current;
    a first impedance presented to the first current;
    a second impedance presented to the second current;
    a DC supply circuit in series with the second impedance to thereby form a series combination; and
    a current bypass circuit in parallel with the series combination and operable to bypass a portion of the first current around the series combination.

2. The circuit of claim 1 wherein the first impedance is a sense resistance operable to transmit the first current, such that a device variable of a device external to the circuit is set according to a sense voltage across the sense resistance and proportional to the first current.

3. The circuit of claim 1 wherein the first impedance is in series with the parallel combination of the current bypass circuit and the series combination.

4. The circuit of claim 1 wherein the first impedance is additionally presented to the second current.

5. The circuit of claim 1 wherein the second impedance comprises a passive resistive element.

6. The circuit of claim 1 wherein the DC supply circuit comprises a DC/DC converter operable to drive current forwards and backwards therethrough.

7. The circuit of claim 1 wherein the portion of the first current is determined based on a difference between a magnitude of the first current and an amount of drive current required to drive a load device.

8. The circuit of claim 1 wherein the current bypass circuit is operable to maintain a stable DC voltage at the two-wire interface.

9. The circuit of claim 1 wherein the portion of the first current is determined based on a magnitude of the first current, thereby forming a pre-determined relationship between an output current of the circuit and the first current.

10. The circuit of claim 9 wherein the magnitude of the first current is measured at the first impedance.

11. The circuit of claim 9 wherein an input voltage measured at the two-wire interface increases with a decrease in the first current.

12. The circuit of claim 9 wherein the circuit presents a negative impedance at the two wire interface.

13. The circuit of claim 9 wherein the portion of the current is driven through the DC supply circuit and output through the two-wire interface.

14. The circuit of claim 1 wherein the first current has a frequency below approximately 500 Hz.

15. The circuit of claim 1 wherein the second current is super-imposed over the first current and carries a digital communications signal.

16. A circuit comprising:
a first impedance;
a second impedance;
a DC/DC converter in series with the second impedance and forming a series combination; and
a current bypass circuit in parallel to the series combination and operable to present the first impedance to a low-frequency, 4–20 mA first current, and further operable to present the second impedance to a high frequency second current, the second current carrying a digital communications signal and superimposed on the first current.

17. The circuit of claim 16 wherein the first impedance includes a sense resistor.

18. The circuit of claim 16 wherein the current bypass circuit presents both the first impedance and the second impedance to the second current.

19. The circuit of claim 16 wherein the first impedance comprises a negative impedance resulting from a reverse current driven from the current bypass circuit through the DC/DC converter and the second impedance.

20. The circuit of claim 19 wherein a magnitude of the reverse current is based on a voltage across a sense resistor, the voltage being proportional to the first current.

21. The circuit of claim 16 wherein a portion of the first current is used to power a device external to the circuit.

22. The circuit of claim 21 wherein a portion of the first current not required to power the device is shunted to ground by the current bypass circuit, thereby maintaining a circuit input voltage at a stable value.

* * * * *